United States Patent
Kominami et al.

(10) Patent No.: US 11,629,724 B2
(45) Date of Patent: Apr. 18, 2023

(54) BLOWER DEVICE AND VEHICULAR AIR-CONDITIONING DEVICE

(71) Applicant: MITSUBISHI HEAVY INDUSTRIES THERMAL SYSTEMS, LTD., Tokyo (JP)

(72) Inventors: Satoshi Kominami, Tokyo (JP); Tomoki Nakamura, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 17/176,458

(22) Filed: Feb. 16, 2021

(65) Prior Publication Data

US 2021/0164480 A1    Jun. 3, 2021

Related U.S. Application Data

(62) Division of application No. 16/092,641, filed as application No. PCT/JP2017/024877 on Jul. 6, 2017, now abandoned.

(30) Foreign Application Priority Data

Jul. 15, 2016   (JP) ................. 2016-140550

(51) Int. Cl.
*F04D 25/08*    (2006.01)
*B60H 1/32*     (2006.01)
(Continued)

(52) U.S. Cl.
CPC ............ *F04D 25/082* (2013.01); *B60H 1/32* (2013.01); *F04D 25/06* (2013.01);
(Continued)

(58) Field of Classification Search
CPC .. F04D 25/06; F04D 29/4226; F04D 29/5806; F04D 29/58–582;
(Continued)

(56) References Cited

U.S. PATENT DOCUMENTS 6,107,708 A    8/2000 Yamaguchi et al.
6,604,906 B2   8/2003 Ozeki et al.
(Continued)

FOREIGN PATENT DOCUMENTS

JP    61-21817 A      1/1986
JP    2000-343924 A   12/2000
(Continued)

OTHER PUBLICATIONS

International Search Report (Form PCT/ISA/210), dated Sep. 26, 2017, for International Application No. PCT/JP2017/024877, with an English translation.
(Continued)

*Primary Examiner* — Alexander B Comley
(74) *Attorney, Agent, or Firm* — Birch, Stewart, Kolasch & Birch, LLP

(57) ABSTRACT

A blower device and a vehicular air-conditioning device including a chamber for air flow so as to cool a motor, whereby water drops are prevented from reaching the motor with higher reliability. Included is a casing having an air intake port, an air discharge port, and a discharge flow path portion communicating between the air intake port and the air discharge port; a scroll fan provided in the casing to take in the air from the air intake port and generate an air flow to the air discharge port through the discharge flow path portion; a motor rotationally driving the scroll fan; and a motor cooling unit cooling the motor. The motor cooling unit includes a chamber for partial air flow from the discharge flow path portion and a cooling duct having an
(Continued)

opening portion which opens into the chamber at one end and supplying air to the motor.

3 Claims, 5 Drawing Sheets

(51) Int. Cl.
  *F04D 29/58* (2006.01)
  *F04D 29/42* (2006.01)
  *F04D 25/06* (2006.01)
  *B60H 1/00* (2006.01)

(52) U.S. Cl.
  CPC ....... *F04D 29/4226* (2013.01); *F04D 29/582* (2013.01); *F04D 29/5806* (2013.01); *B60H 1/00* (2013.01); *B60H 1/00035* (2013.01); *B60H 1/00471* (2013.01); *F04D 25/08* (2013.01); *F04D 29/58* (2013.01); *F04D 29/5826* (2013.01)

(58) Field of Classification Search
  CPC . F04D 29/584–5846; F04D 25/08–082; B60H 1/32
  See application file for complete search history.

(56) References Cited

U.S. PATENT DOCUMENTS

| | | | |
|---|---|---|---|
| 6,998,740 B2 | 2/2006 | Matsuki | |
| 7,011,506 B2 | 3/2006 | Kim | |
| 7,118,355 B2 | 10/2006 | Lipa, III et al. | |
| 7,780,405 B2 * | 8/2010 | Araki | F04D 29/5806 415/206 |
| 10,288,077 B2 | 5/2019 | Motomura | |
| 10,451,078 B2 * | 10/2019 | Ueda | B60H 1/00471 |
| 2003/0008610 A1 | 1/2003 | Tsunooka et al. | |
| 2004/0263009 A1 | 12/2004 | Noda et al. | |
| 2007/0177996 A1 | 8/2007 | Chapman et al. | |
| 2007/0237626 A1 * | 10/2007 | Pouysegur | F04D 29/584 415/206 |
| 2011/0189033 A1 * | 8/2011 | Czulak | F04D 29/584 417/369 |
| 2017/0051750 A1 | 2/2017 | Handwerk et al. | |
| 2017/0237626 A1 | 8/2017 | Nair et al. | |

FOREIGN PATENT DOCUMENTS

| | | | | |
|---|---|---|---|---|
| JP | 2001-180248 A | | | 7/2001 |
| JP | 2003-80924 A | | | 3/2003 |
| JP | 2007-1541 A | | | 1/2007 |
| JP | 2007001541 A | * | | 1/2007 |
| JP | 2008-202502 A | | | 9/2008 |
| JP | 2008202502 A | * | | 9/2008 |
| JP | 2009-525434 A | | | 7/2009 |
| JP | 2010-59825 A | | | 3/2010 |
| JP | 2011-252478 A | | | 12/2011 |
| JP | 2015-123845 A | | | 7/2015 |
| JP | 2000-043532 A | | | 2/2020 |

OTHER PUBLICATIONS

Japanese Office Action dated Mar. 31, 2020 in Japanese Patent Application No. 2016-140550 with an English Translation.
Written Opinion of the International Searching Authority (Form PCT/ISA/237), dated Sep. 26, 2017, for International Application No. PCT/JP2017/024877, with an English translation.
German Office Action dated Nov. 29, 2022 in corresponding German Application No. 112017003590.2 with an English Translation.

* cited by examiner

BLOWER DEVICE AND VEHICULAR AIR-CONDITIONING DEVICE

TECHNICAL FIELD

The present invention relates to a blower device and a vehicular air-conditioning device.

BACKGROUND ART

There is known a blower device of a vehicular air-conditioning device or the like, which is configured by a casing, a scroll fan, and a motor for rotationally driving the scroll fan. Such a blower device takes the air into a center portion of the scroll fan from an air intake port formed in the casing by means of the scroll fan rotationally driven by the motor. The intake air is blown by the rotating scroll fan toward a radially outer portion thereof, passes through a scroll flow path formed in the radially outer portion of the scroll fan, and then is discharged through a downstream side discharge nozzle.

What is carried out in such a blower device is to take a part of the air discharged from the scroll fan into a chamber and supply the air to a motor through a duct that opens into the chamber at one end so as to cool the motor for rotationally driving the scroll fan.

Here, the air taken into the casing through the air intake port may contain water in some cases. When the water reaches the motor through the duct, it may possibly adversely affect an operation of the motor.

To deal with this, Patent Document 1, for example, describes a configuration that a step portion is formed at an air intake port for taking the air into a chamber from a discharge nozzle so as to prevent intrusion of water drop into the chamber.

CITATION LIST

Patent Document

Patent Document 1: JP 2010-59825 A

SUMMARY OF INVENTION

Technical Problem

However, even in the configuration described in Patent Document 1, for example, water (water drop) in the air cannot be sufficiently collected in some cases and it is desired to prevent water drop from reaching the motor with higher reliability.

The present invention has been made in view of the above-described circumstances and accordingly, an object of the invention is to provide a blower device and a vehicular air-conditioning device which can more reliably prevent water drop from reaching a motor.

Solution to Problem

To solve the above-described problem, a blower device and a vehicular air-conditioning device according to the present invention adopt the following means.

A blower device according to the present invention includes: a casing including an air intake port, an air discharge port, and a flow path portion communicating between the air intake port and the air discharge port; a fan provided in the casing to take in air from the air intake port and generate an air flow to the air discharge port through the flow path portion; a motor rotationally driving the fan; and a motor cooling unit cooling the motor, the motor cooling unit including a chamber taking therein a part of the air through the flow path portion, and a duct having an opening portion that opens into the chamber and supplying, to the motor, the air in the chamber taken in through the opening portion, a ceiling portion of the chamber having an inclined surface that is inclined downward from above.

According to the blower device of the present invention, the air taken into the casing through the air intake port by the fan rotationally driven by the motor is sent out to a flow path portion by the fan rotationally driven by the motor. A part of the air flowing in the flow path portion is taken into the chamber and supplied to the motor through a duct from an opening portion so as to cool the motor. When water drop forms on a ceiling portion of the chamber due to water, etc. in the air taken into the chamber, an inclined surface of the ceiling portion lets the water drop flow downward from above along an inclination direction of the inclined surface. This makes it possible to suppress intrusion of water drop from an opening portion of a motor cooling unit into the duct.

In the above-described blower device, it is more preferred that the inclined surface be formed at least vertically above the opening portion.

With such a blower device, the inclined surface formed vertically above at least the opening portion can prevent water drop from falling to the opening portion with higher reliability.

In the above-described blower device, it is more preferred that the inclined surface be formed into an umbrella shape that is gradually inclined downward to a radially outer portion from a central portion of the ceiling portion.

With such a blower device, when water drop forms on the ceiling portion, it can be guided to a wall surface at the radially outer portion of the ceiling portion.

A vehicular air-conditioning device according to the present invention includes the above-described blower device.

According to the vehicular air-conditioning device of the present invention, because the blower device has the inclined surface at the ceiling portion, it is possible to suppress intrusion of water drop into the motor cooling unit and prevent it from reaching the motor.

Advantageous Effect of Invention

According to the blower device and the vehicular air-conditioning device of the present invention, it is possible to more reliably prevent water drop from reaching the motor.

DESCRIPTION OF EMBODIMENTS

Embodiments of a blower device and a vehicular air-conditioning device according to the present invention are described below with reference to the drawings.

Figure 1:
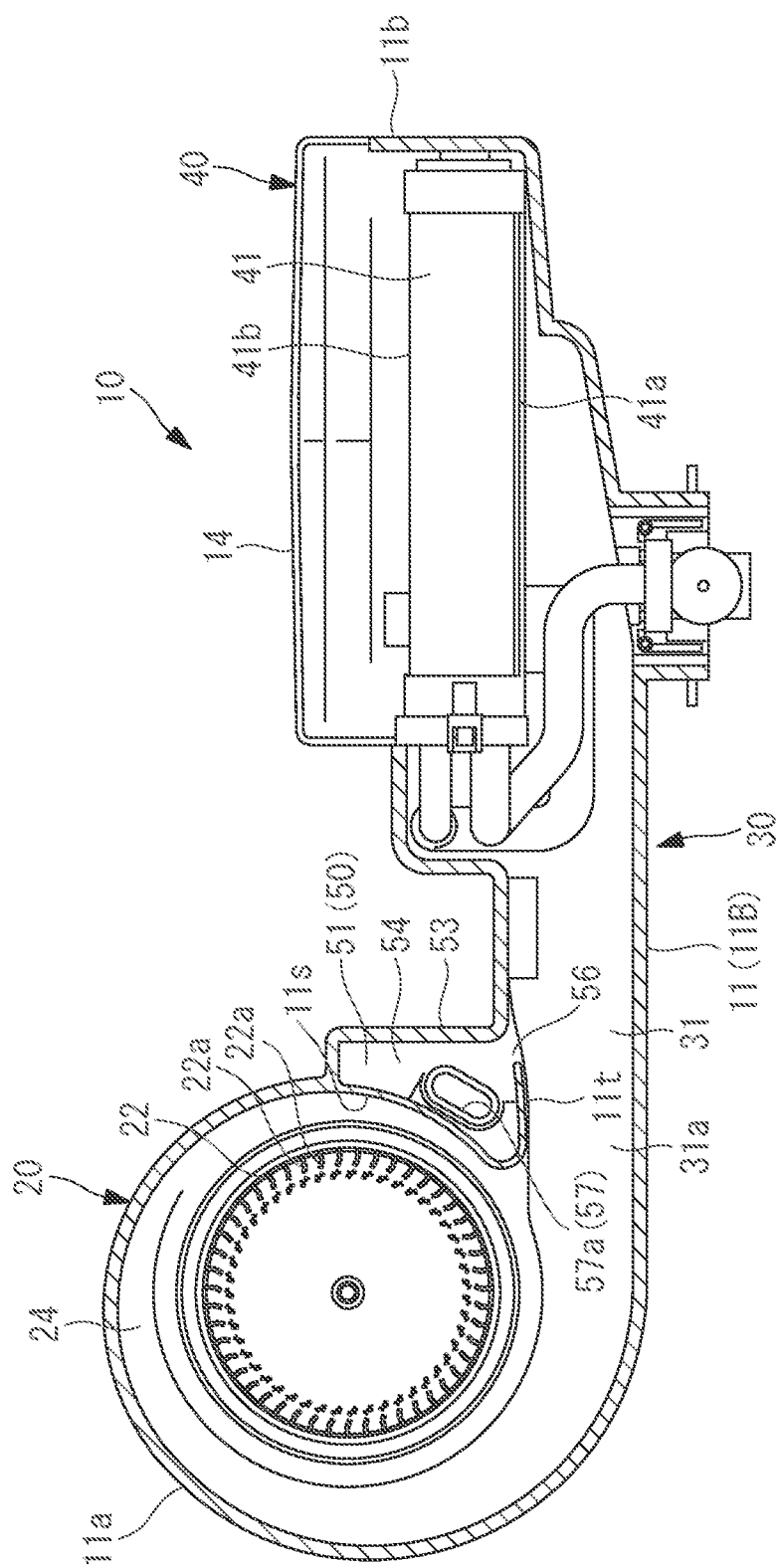
FIG. 1 is a plan view illustrating an internal configuration of a blower device according to the present embodiment.
Figure 2:
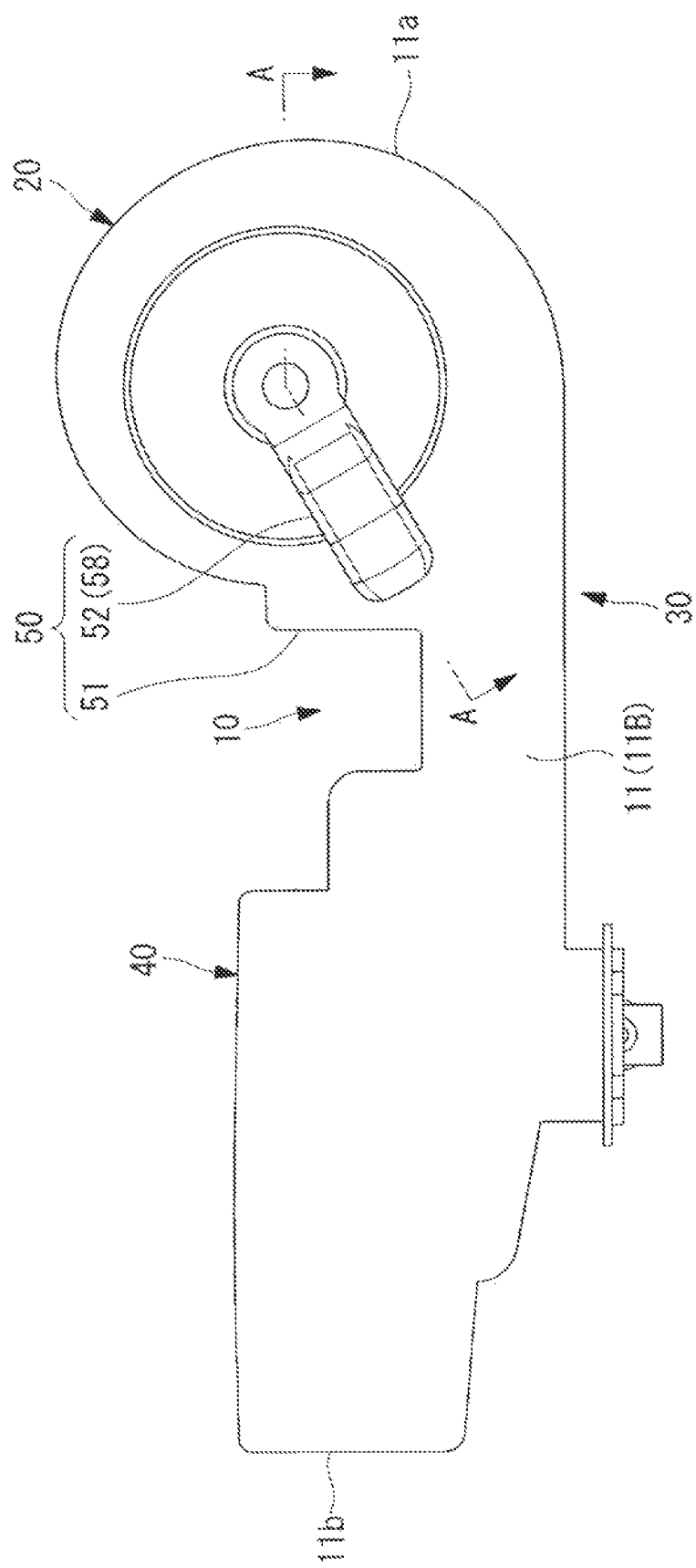
FIG. 2 is a bottom view illustrating the blower device.
Figure 3:
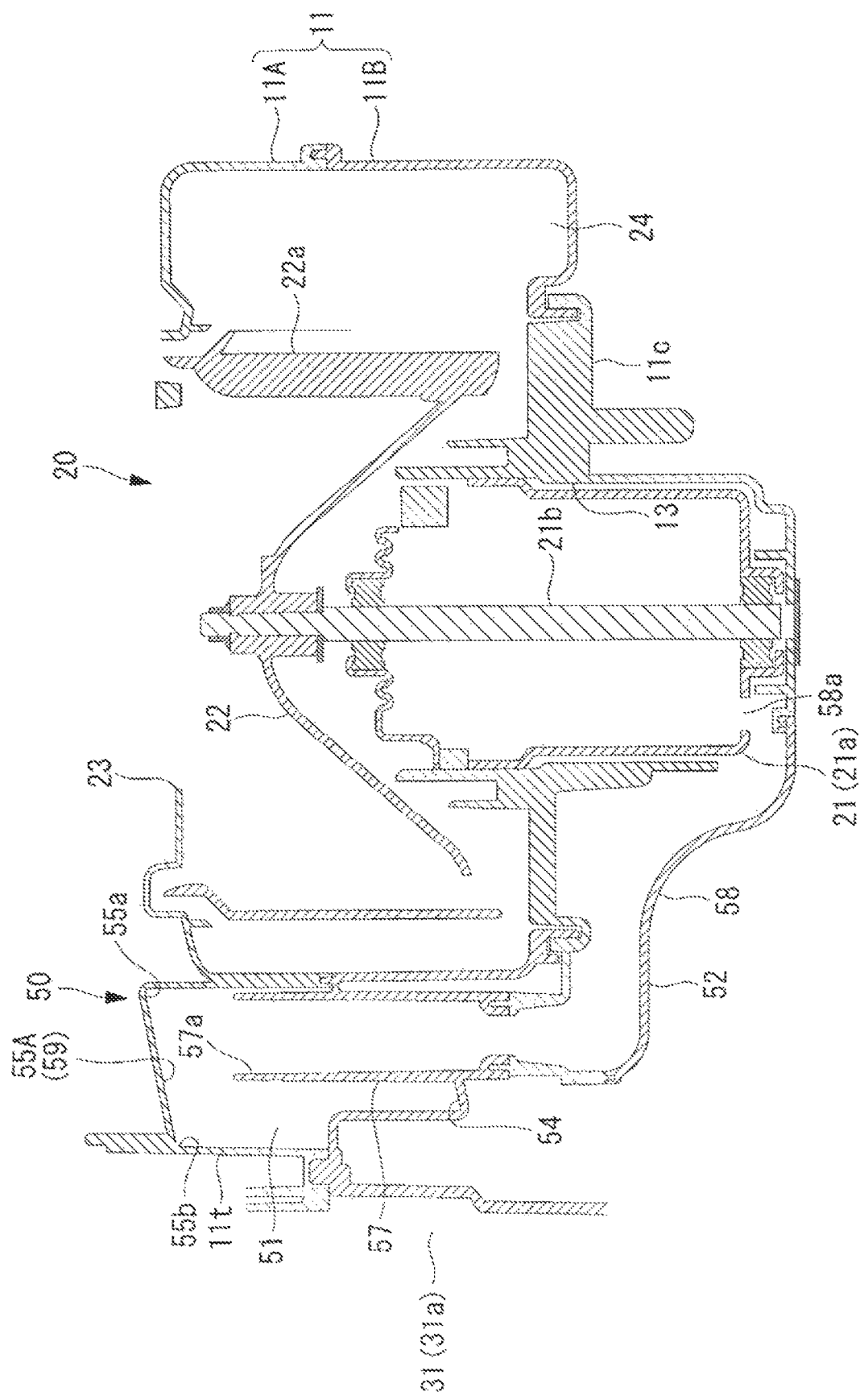
FIG. 3 is a cross-sectional view taken along A-A line of FIG. 2, illustrating a configuration of a fan unit of the blower device.
Figure 4:
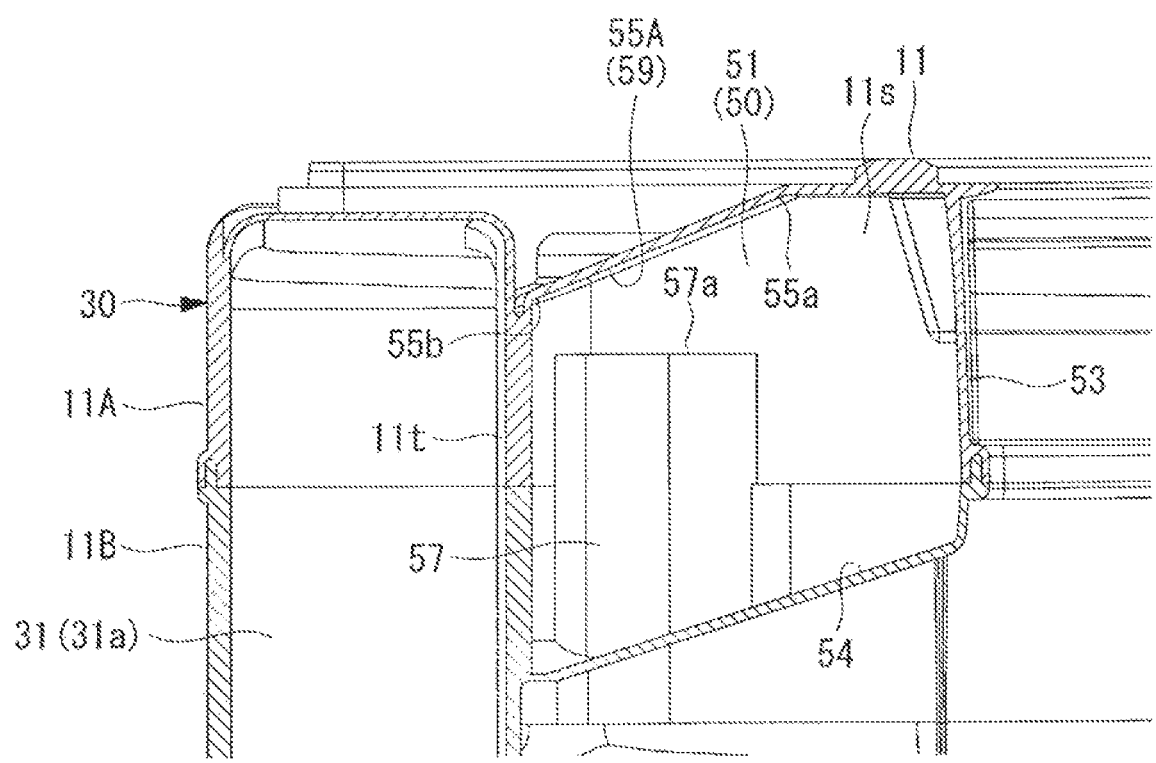
FIG. 4 is a vertical cross-sectional view illustrating a chamber of the blower device.
Figure 5:
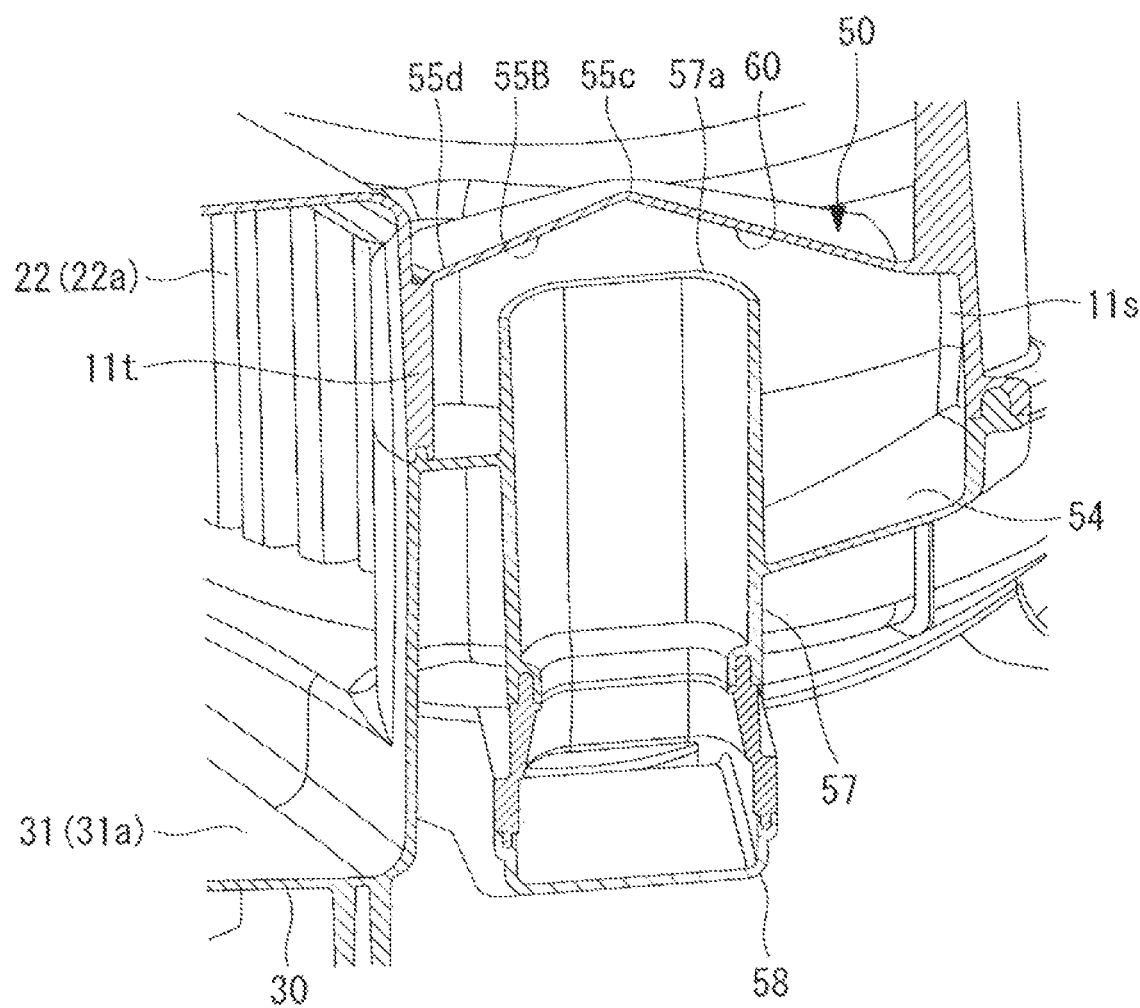
FIG. 5 is a vertical cross-sectional view illustrating a chamber of a blower device according to a modification of the present embodiment.

FIG. 1 is a plan view illustrating an internal configuration of a blower device according to the present embodiment. FIG. 2 is a bottom view illustrating the blower device. FIG. 3 is a cross-sectional view taken along A-A line of FIG. 2, illustrating a configuration of a fan unit of the blower device. FIG. 4 is a cross-sectional plan view illustrating a chamber of the blower device. FIG. 5 is a vertical cross-sectional view illustrating the chamber.

Blower Device

As illustrated in FIGS. 1 and 2, a blower device 10 constituting the vehicular air-conditioning device includes a hollow casing 11, a fan unit 20 provided on a first end 11a side of the casing 11 so as to generate wind, a discharge nozzle unit 30 discharging the wind generated by the fan unit 20, a heat exchanger housing unit 40 provided on a second end 11b side of the casing 11 so as to house an evaporator 41, and a motor cooling unit 50.

As illustrated in FIG. 3, the casing 11 has a two-part configuration with upper and lower portions, in which a bottomed, upper casing 11A that opens upward and a bottomed, lower casing 11b that opens downward are combined and connected together in the vertical direction.

Fan Unit

As illustrated in FIGS. 1 and 3, the fan unit 20 includes a motor 21 (see FIG. 3), a scroll fan 22 provided in the casing 11 and rotationally driven by the motor 21, an air intake port 23 (see FIG. 3) formed in the upper casing 11A, and a scroll flow path portion 24 formed in a radially outer portion of the scroll fan 22 in the casing 11.

As illustrated in FIG. 3, the motor 21 includes a motor main body 21a that is held in a manner of being fit into a motor holding opening 13 formed at a bottom plate portion 11c of the lower casing 11B, and a motor shaft 21b that is axially, rotationally driven by the motor main body 21a. The motor 21 is provided such that the motor shaft 21b protrudes upward from the bottom plate portion 11c of the lower casing 11B.

The scroll fan 22 is provided above the bottom plate portion 11c of the lower casing 11B while being integrally connected to the motor shaft 21b. The scroll fan 22 has a cylindrical shape with the motor shaft 21b as its center, and includes a plurality of blades 22a provided in an outer circumferential portion thereof at intervals in the circumferential direction. This scroll fan 22 is rotationally driven together with the motor shaft 21b by the motor 21, to take the outside air from an air intake port 23 formed in the upper casing 11A into a radially inner portion of the scroll fan 22 and also, send the intake air to a radially outer portion of the scroll fan 22.

As illustrated in FIG. 1, the scroll flow path portion 24 is formed continuously in the circumferential direction at the radially outer portion of the scroll fan 22. The scroll flow path portion 24 gradually increases a cross-sectional area of its flow path toward a downstream side in the air flow direction along the circumferential direction.

Discharge Nozzle Unit

The discharge nozzle unit 30 includes a discharge flow path portion 31 formed in the casing 11, extending straight in the tangential direction from a downstream end of the scroll flow path portion 24 of the fan unit 20 and guides the air sent from the scroll flow path portion 24 to the downstream side through this discharge flow path portion 31.

Heat Exchanger Housing Unit

The heat exchanger housing unit 40 includes an evaporator 41 housed in the casing 11. The evaporator 41 is provided with its first surface side 41a facing a downstream end 31b side of the discharge flow path portion 31 of the discharge nozzle unit 30. Also, the casing 11 has an air discharge port 14 communicating with the outside and inside of the casing 11, at a position opposing a second surface side 41b of the evaporator 41.

In such a heat exchanger housing unit 40, the air sent from the scroll flow path portion 24 and taken in through the discharge flow path portion 31 passes from the first surface side 41a to the second surface side 41b, of the evaporator 41 and exchanges heat with a refrigerant flowing in the evaporator 41. The air, after being subjected to heat exchange in the evaporator 41, is discharged to the outside of the casing 11 from the air discharge port 14 of the casing 11.

Motor Cooling Unit

As illustrated in FIG. 3, the motor cooling unit 50 cools the motor main body 21a of the motor 21 for rotationally driving the scroll fan 22 of the fan unit 20. This motor cooling unit 50 includes a chamber 51 taking therein the air from the discharge flow path portion 31 of the discharge nozzle unit 30, and a cooling duct 52 sending the air in the chamber 51 toward the motor main body 21a.

As illustrated in FIGS. 1, 3, and 4, the chamber 51 is formed in a region between the discharge flow path portion 31 and the scroll flow path portion 24, at an upstream portion 31a of the discharge flow path portion 31 of the discharge nozzle unit 30. Specifically, in the casing 11, the chamber 51 is surrounded by an outer peripheral wall 11s provided at a radially outer portion of the scroll flow path portion 24, a side wall 11t provided on one side in the width direction, of the discharge flow path portion 31, an L-shaped wall 53 of an L shape in plan view extending outward from an outer surface of the outer peripheral wall 11s and connecting to an outer surface of the side wall 11t, a bottom plate portion 54 formed in the lower casing 11B, and a ceiling portion 55A formed in the upper casing 11A.

Moreover, the chamber 51 communicates with the discharge flow path portion 31 through a communication opening 56 formed in the side wall 11t, and a part of the air flowing through the discharge flow path portion 31 flows into the chamber 51 from this communication opening 56.

As illustrated in FIG. 3, the cooling duct 52 includes a cylindrical suction nozzle 57 having an opening portion 57a that opens vertically upward inside the chamber 51 and protruding upward from the bottom plate portion 54 of the chamber 51, and a cylindrical guide flow path portion 58 continuous to the suction nozzle 57, provided along a lower portion of the bottom plate portion 11c of the lower casing 11B. The guide flow path portion 58 includes a spray nozzle 58a spraying the air to the motor main body 21a that protrudes downward from the bottom plate portion 11c of the lower casing 11B.

In this motor cooling unit 50, the air flowing into the chamber 51 from the discharge flow path portion 31 through the communication opening 56 is sent from the opening portion 57a that opens into the chamber 51, to the suction nozzle 57. The air sent to the suction nozzle 57 passes the guide flow path portion 58 and then is sprayed to the motor main body 21a by the spray nozzle 58a to cool the motor main body 21a.

As illustrated in FIGS. 3 and 4, in the above-described motor cooling unit 50, the ceiling portion 55A of the chamber 51 has an inclined surface 59 that is inclined obliquely downward from one end portion 55a to the other end portion 55b. The inclined surface 59 is formed at least in a region of the ceiling portion 55A including a portion vertically above the opening portion 57a of the suction nozzle 57.

Here, there are no limitations on the positions of the end portions 55a and 55b provided in upper and lower portions in the inclination direction, respectively, at the inclined surface 59 of the ceiling portion 55A. For example, in the ceiling portion 55A, the end portion 55b may be on the communication opening 56 side and the end portion 55a may be on the side far from the communication opening 56.

In a case where water drop forms on the ceiling portion 55A of the chamber 51 due to water, etc. in the air taken into the chamber 51, this inclined surface 59 allows the water drop to flow downward from above in the inclination direction along the inclined surface 59. In this embodiment, the water drop made to flow downward along the inclined surface 59 is discharged from the communication opening 56 to the discharge flow path portion 31.

According to the above-described configuration, the blower device 10 includes the motor cooling unit 50 equipped with the chamber 51 taking in a part of the air from the discharge flow path portion 31 and the cooling duct 52 having the opening portion 57a that opens into the chamber 51 and supplying, to the motor 21, the air in the chamber 51 taken in through the opening portion 57a and the ceiling portion 55A of the chamber 51 has the inclined surface 59 that is inclined downward from above. With this configuration, when water drop forms on the ceiling portion 55A of the chamber 51 due to water, etc. in the air taken into the chamber 51, the inclined surface 59 of the ceiling portion 55A allows the water drop to flow downward from above along the inclination direction of the inclined surface 59. This makes it possible to suppress the intrusion of water drop from the opening portion 57a of the motor cooling unit 50 into the cooling duct 52 and prevent it from reaching the motor 21.

Also, the inclined surface 59 formed at least vertically above the opening portion 57a can prevent water drop from falling on the opening portion 57a with higher reliability.

Also, according to a vehicular air-conditioning device (not illustrated) equipped with the blower device 10 of the present embodiment, the inclined surface 59 formed at the ceiling portion 55A of the blower device 10 can suppress the intrusion of water drop into the cooling duct 52 from the opening portion 57a of the motor cooling unit 50 and prevent it from reaching the motor 21.

Modification of Embodiment

In the above-described embodiment, the ceiling portion 55A of the chamber 51 is inclined obliquely downward from the one end portion 55a to the other end portion 55b; however, the present invention is not limited thereto.

FIG. 5 is a vertical cross-sectional view illustrating a chamber of a blower device according to a modification of the present embodiment.

For example, as illustrated in FIG. 5, the ceiling portion 55B of the chamber 51 may be formed by an inclined surface 60 of an umbrella shape extending obliquely downward to an outer circumferential end portion 55d at a radially outer portion from a central portion 55c of the ceiling portion 55B in plan view.

In such a configuration as well, owing to the umbrella-like inclined surface 60 of the ceiling portion 55B of the chamber 51, when water drop forms on the ceiling portion 55B, the water drop can be guided toward the radially outer portion of the ceiling portion 55B. This makes it possible to suppress the intrusion of water drop from the opening portion 57a of the motor cooling unit 50 into the cooling duct 52 and prevent it from reaching the motor 21.

Note that the above-described embodiment is described of the configuration of the blower device 10; however, the configuration of the respective units can be changed as appropriate within the gist of the present invention.

REFERENCE SIGNS LIST

10 Blower device
11 Casing
14 Air discharge port
21 Motor
22 Scroll fan (fan)
23 Air intake port
31 Discharge flow path portion (flow path portion)
50 Motor cooling unit
51 Chamber
52 Cooling duct (duct)
55A, 55B Ceiling portion
57a Opening portion
58 Guide flow path portion
58a Spray nozzle
59, 60 Inclined surface

The invention claimed is:

1. A blower device comprising: a casing comprising an air intake port, an air discharge port, and a flow path portion communicating between the air intake port and the air discharge port; a fan taking in air from the air intake port and generating an air flow to the air discharge port through the flow path portion; a motor rotationally driving the fan; and a motor cooling unit cooling the motor, the flow path portion comprising a scroll flow path portion formed continuously in a circumferential direction at a radially outer portion of the fan, and a discharge flow path portion extending straight in a tangential direction from a downstream end of the scroll flow path portion, the motor cooling unit comprising a chamber defined by the casing and taking therein a part of the air flow from a side wall of the discharge flow path portion, and a duct having an opening portion that opens vertically upward inside the chamber and that forms an intake end of the duct, the duct supplying, to the motor, the air in the chamber taken in through the opening portion, the duct being configured to take in the air in the chamber from above the opening portion, the duct being provided spaced apart from a wall of the casing that defines the chamber, in a planar view, a ceiling portion serving as an outermost wall of the chamber and having an inclined surface that is inclined downward from above, and the inclined surface being formed at least in the ceiling portion of the chamber located vertically above the opening portion.

2. The blower device according to claim 1, wherein the inclined surface is formed into a conical shape that is gradually inclined downward to a radially outer portion from a central portion of the ceiling portion.

3. A vehicular air-conditioning device comprising the blower device according to claim 1.

* * * * *